United States Patent
Guarneri et al.

[19]

[11] Patent Number: 5,886,991
[45] Date of Patent: Mar. 23, 1999

[54] SYSTEM AND METHOD FOR QUICKLY DISTRIBUTING PROGRAM UPDATES IN A DISTRIBUTED ARCHITECTURE PROCESSING SYSTEM

[75] Inventors: Paul Joseph Guarneri, Naperville, Ill.; Thomas Joseph Killian, Westfield, N.J.; Venkata Chalapathi Majeti, Naperville, Ill.; Norman Loren Schryer, New Providence, N.J.

[73] Assignee: Lucent Technologies Inc., Murray Hill, N.J.

[21] Appl. No.: 572,286

[22] Filed: Dec. 13, 1995

[51] Int. Cl.⁶ ........................................ H04J 3/02
[52] U.S. Cl. .............................. 370/389; 370/400
[58] Field of Search ........................ 370/389, 395, 370/390, 392, 393, 394, 400, 401, 402, 403, 408, 407, 216, 223, 256, 310, 312, 364, 388

[56] References Cited

U.S. PATENT DOCUMENTS

| | | | |
|---|---|---|---|
| 4,710,917 | 12/1987 | Tompkins et al. | 370/271 |
| 5,014,267 | 5/1991 | Tompkins et al. | 370/522 |
| 5,446,726 | 8/1995 | Rostoker et al. | 370/395 |

*Primary Examiner*—Dang Ton
*Attorney, Agent, or Firm*—Michael B. Johannesen

[57] ABSTRACT

A system to deliver data at very high data transmission speeds to many units in a distributed processing system simultaneously. A distributed processing system is supplied with a local area network (LAN) which is connected to each unit of the distributed processing system. Each unit is also equipped with a LAN interface card so that it may receive messages (and send messages if necessary) between itself and the system supplying the data. Speed of data delivery is increased to the speed of the LAN, which may be many times greater than is currently possible.

6 Claims, 17 Drawing Sheets

SYSTEM AND METHOD FOR QUICKLY DISTRIBUTING PROGRAM UPDATES IN A DISTRIBUTED ARCHITECTURE PROCESSING SYSTEM

CROSS-REFERENCE TO RELATED APPLICATIONS

This patent application is related to U.S. patent application Ser. No. 08/572,248 Guarneri, et al., case 1-2-8-2 now U.S. Pat. No. 5,724,345, and U.S. patent application Ser. No. 08/572,247 Guarneri, et al., case 3-4-10-4 U.S. Pat. No. 5,631,907, which issued on May 20, 1997, filed concurrently herewith.

TECHNICAL FIELD

This invention relates to the field of electronic software distribution, and, more specifically, to distribution of executable code (i.e., object code), which requires very highly reliable (zero fault tolerance) data transmission throughout a system with a distributed architecture.

DEFINITIONS

Telephone, computer, and data communications technologies all use common terms that sometimes imply different meanings. A brief definition of terms relating to current application are listed here.

1.) Synchronous Satellite: A satellite for which the mean sidereal period of revolution is equal to the sidereal period of rotation of the primary body about which the satellite is revolving.

2.) Geosynchronous Satellite: A synchronous satellite with the Earth as its primary body.

3.) Satellite earth terminal: That portion of a satellite link which receives, processes, and transmits communications between a ground station on the Earth and a satellite.

4.) Satellite Uplink: Communications (usually microwave) link from a ground station to a satellite.

5.) Satellite Downlink: Communication link from a satellite to a ground station.

6.) Point-to-point connection: An arrangement whereby a communication link is established which exchanges messages between two (and only two) designated stations, such as station A and station B, as illustrated in FIG. 1. The message may include data relating to the application (referred to as a "pay load"), and data relating to the network (such as addressing, message identifier, etc., referred to collectively as a "header"). In addition, messages may require confirmation, i.e., an acknowledgement is expected from the receiver (station B). Alternately, the transmitter, station A, may send a message may be sent "unconfirmed," in which case the transmitting process does not wait for any acknowledgements. In the normal or usual case (i.e., when station A sends a message to station B), a send process 101 in station A receives data from a software process 103, translates and/or formats it according to a previously agreed-to protocol, and sends the message across communications link 105. Receive process 107 in station B performs any translation and/or format function, again according to the protocol, and delivers the message to software process 109.

Additionally, send process 111 in station B sends an acknowledgement of receipt or non-receipt (as determined by software process 109) across communications link 105 to receive process 113 in station A. Receive process 113 delivers the acknowledgement message to software process in station A, and determines whether to send the next portion of the data or to retransmit the last data sent. Thus, a reliable one-to-one transmission protocol may be established. However, the tradeoff is that the speed of data delivery is slow, due to the one-to-one connection and the wait for each message to be confirmed being time consuming.

7.) Broadcasting and Multicasting: These are broad terms used in the industry to refer to point-to-multipoint and multipoint-to-multipoint communications, as illustrated in FIGS. 2 and 3, respectively. In a point-to-multipoint arrangement (FIG. 2), communication is established similarly to that described in FIG. 1 between one station, designated as the sender, and multiple stations, designated as receivers 1–N. This type of arrangement is typically used in transferring information from one location, e.g., news editors, to many locations that need the information, e.g, printing presses. In this configuration, each receive process 201–203 must acknowledge proper receipt of data through its respective send process 204–206. All of these responses must be received by receive process 207 in sender and delivered to software process 208 for determination whether all receivers received the data correctly. If not, then send process 209 in sender must retransmit the data to one or more receive processes 201–203.

As can be readily seen in the above scenario, this type of broadcast is very slow and expensive, for the same reasons as cited above, with even more messages to be accounted for. There is also an upper limit to the number of receives that can be attached to sender. With current technology, only 30–40 receivers can be attached successfully to a single sender before the sender exhausts both its memory and computational power.

In FIG. 3, the multipoint-to-multipoint arrangement, referred to herein as multicast, establishes communication among many designated stations. This type of arrangement is typically found in such applications as local area networks and conferencing. At any given time, one of the stations is designated as the sender by means of a token and other stations are designated as receivers. The token passing arrangement may be pre-defined, sequential, cyclic, or passed from station to station on demand (as is well known in the art). However, for the purpose of the current application, the term "broadcast" is used to refer to point-to-multipoint arrangement, similar to FIG. 2.

8.) Reliable: This term refers to procedures that guarantee delivery of information without errors. On point-to-point connections, protocols are generally implemented to recover lost or unacknowledged messages through retransmission. In broadcast and multicast connections, different techniques are used to improve the efficiency of a protocol for reliable transfer of messages. As a general practice, messages are retransmitted at the data-link level, which includes header and payload information, or at a "frame" level, wherein the frame encapsulates several messages involving header and payload data into a larger message. As used herein, the term "reliable" is used from an application perspective, not a message perspective.

9.) Scalable: This term refers to a network architecture where the number of receivers may be variable and may increase by several orders of magnitude. As known in the prior art, an increase in the number of receivers demands corresponding increase in performance requirements on the sender (as described above in FIGS. 2 and 3 and accompanying text). A typical server in a local area network supports broadcast service for approximately 10 to 15 receivers.

If the number of receivers were to increase to a larger number such as 100 or 150 (a ten-fold increase), current approaches to broadcast and multicast communications would become ineffective as the requirements on the server grows beyond its system capacity.

BACKGROUND OF THE INVENTION

Distribution of software, and specifically object code, for use in processing systems has been a problem since the beginning of stored program controlled systems. For example, in the area of telephone switching systems, stored program control has been used since the middle 1960's. In order to distribute a new operational programs (software) that operates these systems, initially a technician had to go to each switching office and physically remove magnetically encoded cards and install new magnetically encoded cards. As technology improved, magnetic tapes were used to transport programs from the point at which they are made to their point of utilization; in fact, magnetic tapes are still used for generic updates which currently involve large quantities (70–100 mega-bytes (MB)) of object code. All such systems required manual steps and high transportation costs for delivery of such software, especially as the size of the software loads grew over time.

Some recent systems rely on telephone data links for distribution of software. For example, the prior art system of FIG. 4 illustrates a typical software distribution system for various switching systems in a telephone network. Such switching systems could be local central office switches supported by a particular manufacturer, such as 5ESS® switches manufactured and supported by AT&T, or, alternatively, may be long distance-type switches such as the 4ESS™ switch, also manufactured and supported by AT&T. Other types of program-controlled systems may benefit from this invention without departing from the scope of the appended claims.

Each switch is connected to a software change and notification system (SCANS) 102. SCANS, as known in the art, provides software updates for switching systems 104–118 by way of data transmissions over lines 120–134 using dedicated point-to-point communication links operating at 9600 bits per second with an X.25 protocol.

FIG. 5 illustrates such a prior art SCANS-to-switching system connection. In the system of FIG. 5, SCANS 100 includes an application program 500, which processes the data to be sent (in the example of switching offices, the object code required). Application program 500 delivers the processed object code to a plurality of communications terminal processes 502–5NN, which communicate with the switching offices. In each communications terminal process 502–5NN, there is a send module 504 and a receive module 506. Send module sends the object code (again, for purposes of this example) over line 122 to switching system 104. Receive module 506 in terminal process 502 of SCANS 100 receives acknowledgement requests for re-tries, etc., as is known in the art, from switching module 104, via line 120.

At the switching system side, switching systems (in this example 102 and 104), also include a terminal process 508–508' which contain a send module 504 and a receive module 506 which are the same, or substantially similar, to the send 504 and receive processes 506 in the communications terminal process 502 of SCANS 100. Terminal process 508 in switching system 104 receives data in receive process 506 and delivers the received data to terminal process 508. Terminal process 508 determines whether data is received in tact, and if so, sends acknowledgements of good reception through send process 504 or re-try requests for data if the data appeared to be corrupted. Switching systems 104 and 102 are shown as having several layers that communicate with communications terminal process 508. First there is a SCANS interface 510 which performs protocol verification, etc. and other functions, as known in the art, with SCANS 100. If the data received appears correct, then SCANS interface 510 passes the received data to input/output process 512, which causes administrative module 514 to further distribute the received software (where the other processes reside). This hierarchy is very much like the system of FIG. 2.

In this manner, changes to the programs which run switching systems 102–118 may be made through a central location, for example, at a SCANS facility 100 outside of Chicago, and then sent to each switching system which requires the change. Furthermore, software updates, where entire sections of programs change, may also be sent to each switch 102–118 in this manner. Finally, an entire generic update (changing the entire operating code) may be sent from SCANS system 102, via lines 120–134, to all switching systems 102–118 which subscribe to or purchase the new generic. Therefore, the size of the data load being transmitted to each switch may vary from a few hundred bytes for a small bug fix to several hundred megabytes for an entire generic.

Turning now to FIG. 6, a prior art system is shown, wherein a switching office is connected to SCANS 100 by way of data line 120. Switching office 104 is, for example, a 5ESS switch, as manufactured by AT&T. As is known in the art, a 5ESS switch (local switch 104) may be a distributed control ISDN electronic telephone switching system such as the system disclosed in U. S. Pat. No. 4,592,048, issued to M. W. Beckner, et al. on May 27, 1986, and assigned to the assignee of this application. Alternatively, local switch 104 may be a digital switch such as a 5ESS switch manufactured by AT&T and described in the AT&T Technical Journal, Vol. 64, Number 6, July/August, 1995, pages 1303–1564.

The architecture of switch 104 includes a communication module 602 as a hub, with switching modules 604, 606, and 608 illustrated (there may be other switching modules but these are not shown for clarity) and an administrative module (AM) 610, emanating from communication module 602. Communication module 602 includes a time-shared, space division switch or time-multiplexed (TM) switch as a fabric for communications among switch modules 604, 606, 608, and between switch modules 604, 606 and 608 the AM 610. AM 610 provides coordination of the functional components of switch 104 and human-machine interface. Switch modules 604, 606, and 608 terminate analog and/or digital subscriber lines through line units (not shown but well-known in the art) and analog or digital trunk units (again, not shown but well known in the art) and communicate with CM 602 over control timeslot 611 (for sending control data) and other timeslots 613 (used for call processing). AM 610 also provides connections to other switching systems through, for example, a signaling system 612 (such as a common-channel-signaling network) by which the switching systems in a network communicate, and to SCANS 100 via connection 120.

In the current art, SCANS 100 sends data on line 120 at approximately 9600 baud. This data rate is adequate when SCANS 100 is sending small changes (or "patches") for code to switching office 104. However, when SCANS 100 is sending major updates or a generic update over line 120, this transmission may take many hours, depending on the size of the load or generic which is being sent to the administrative module 610.

The burden of distributing large software loads, particularly object code, at 9600 bps to AM 610 may slow down or delay other processing work of AM 610. For example, receiving an entire generic causes AM 610 to respond more slowly to signaling messages from signaling network 612 and for routing and administrative function requests from SMs 604–608 and CM 602. Therefore, it has been proposed that AM 610 be assisted by a work station, such as 614 (shown in phantom). Work station 614 is connected to SCANS 100 (instead of AM 610) and then communicates with AM 610 to build loads and otherwise direct AM 610 with the information delivered from SCANS 100. However, there is still a great deal of time involved delivering data from SCANS 100 to work station 614; work station 614 merely eases some of the processing burden on AM 610.

When the load is distributed to the various modules within switch 104, it takes resources and time away from other, more important (i.e., call processing) activities. After work station 614 or administration module AM 610 finish processing the new generic (or other update), then the operational code or other data must be delivered to its final destination module.

AM 610 communicates with communication module 602 over a standard bus connection, as is known in the art. Communication module 602 communicates with each of the switch modules 604, 606, and 608, via a plurality of timeslots. There are types of timeslots, control timeslots 611 and timeslots 613. Timeslots 613 are used for communication purposes, such as telephone calls, data calls, etc. Timeslots 611 are used to control the switch modules themselves. When there is an operating system update of any size, control timeslots 611 are used for transporting the data from communication module 602 to each of the switch modules 604, 606, and 608. Thus, it may take a long time (from minutes to hours) in order to migrate all of the code necessary to replace an entire generic in a switch module.

Therefore, a problem in the art is that there is no method for delivering data at a high rate of speed to multiple units in a distributed processing system simultaneously, while still maintaining reliability of applications processing.

SUMMARY OF THE INVENTION

This problem is solved and a technical advance is achieved in the art by a system and method which delivers data at very high data transmission rates simultaneously to each of the units of a distributed processing system. According to an apparatus aspect of this invention, a distributed processing system (such as the one illustrated in FIG. 6) is supplied with a local area network (LAN) connection to each unit of the distributed processing system. Each unit is also equipped with a LAN interface card so that it may receive messages (and send messages if necessary), and perform any protocol conversions between itself and the system supplying the data (such as work station 614, FIG. 6). In this manner, no timeslots are used (control or otherwise) in order to distributed data, and speed is increased to the speed of the LAN, which can be as high as three or four times greater than is currently possible. This invention may be used advantageously with companion case, U. S. patent application Guarneri 1-2-8-2, in order to further expedite the delivery of generic loads and other update material to diverse portions of a switching system.

BRIEF DESCRIPTION OF THE DRAWING

A more complete understanding of the invention may be obtained from a consideration of the following description in conjunction with the drawings, in which.

DETAILED DESCRIPTION

Figure 7:
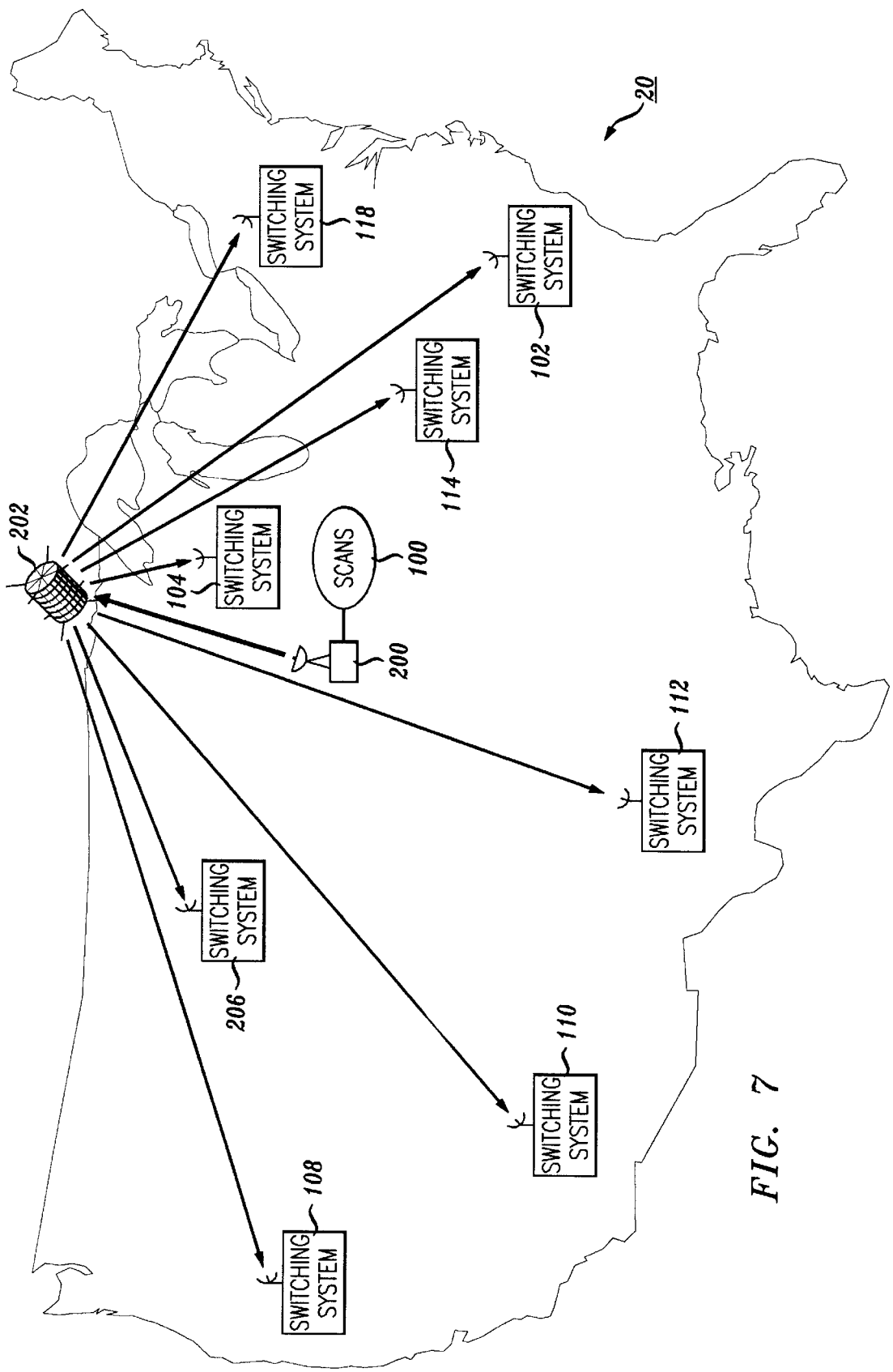
FIG. 7 is a block diagram of a satellite transmission system according to an exemplary embodiment of this invention.

FIG. 7 illustrates an exemplary embodiment of this invention distributing data to a plurality of destinations simultaneously. In this exemplary embodiment, telephone switching systems 102–118 will again be used to illustrate the invention; however, this invention is applicable whenever large amounts of data, software—particularly executable or object code—needs to be transferred to many places at the same time.

In this exemplary embodiment, SCANS system 100 receives the software or data to be transmitted, as in the prior art. This data, for a typical switching system such as the AT&T 5ESS Switch, is approximately 70 MB of executable code in compressed form. The data is processed into blocks, as will be described below, and sent from SCANS 100 to satellite uplink 200. Satellite uplink optionally processes the data further, according to its own format and error correction system, and transmits the data (from first block to last block without pause) to satellite 202. Satellite 202 retransmits the data to a dish antenna at each switch office 102–118. As will be described below, a system at each switching office 102–118 translates the data back into usable form, processes and delivers it as required. SCANS 100 resends the data from first block to last through satellite uplink 200 via satellite 202. Any data blocks not received in the previous transmission(s) may thus be received. Thus, a new system for delivering large amounts of data is shown in FIG. 7.

Figure 8:
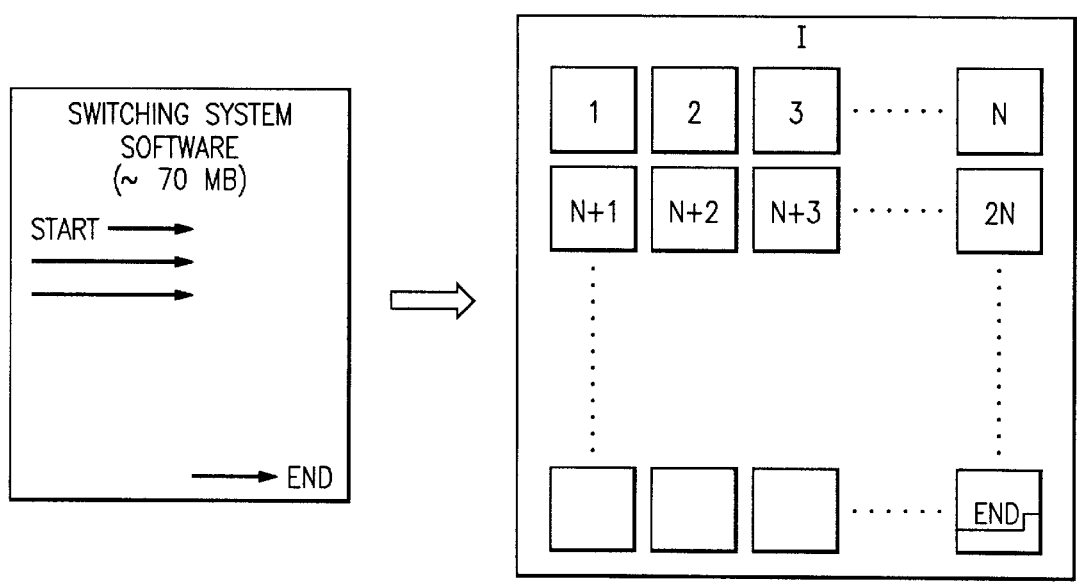
FIG. 8 is a block diagram of data or code packaging as used in the exemplary embodiment of FIG. 7.

Turning to FIG. 8, according to one aspect of this invention, the data is divided into memory pages of 9400 bytes, each as shown in FIG. 8. Each page is arranged in a matrix form of 40 rows and 235 columns. Each memory page is called an Information matrix (I).

Figure 9:
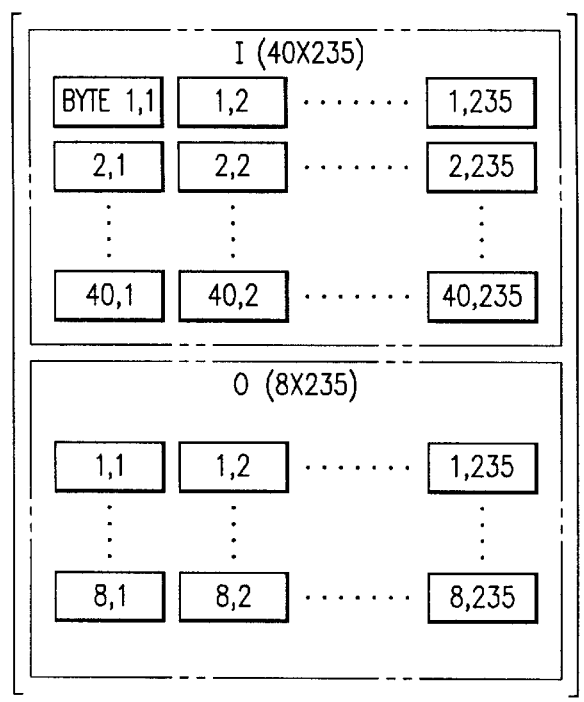
FIG. 9 is an example of a fully packaged data transmission load of FIG. 8.

Turning now to FIG. 9, each page of FIG. 8, Matrix I, is augmented with 1880 bytes of information arranged in a matrix form of 8 rows and 235 columns, which contain operational information. The operational information includes such information as file numbers, software package identification, sequence numbers for memory pages, ATM transport cell identification, methods for encryption/decryption, information regarding decompression of the user data, and broadcast addressing scheme to activate preset receiving stations. The resulting data is called the Operations matrix (O). Together, data from I and O arranged in 48 rows and 235 columns comprise user data.

Figure 10:
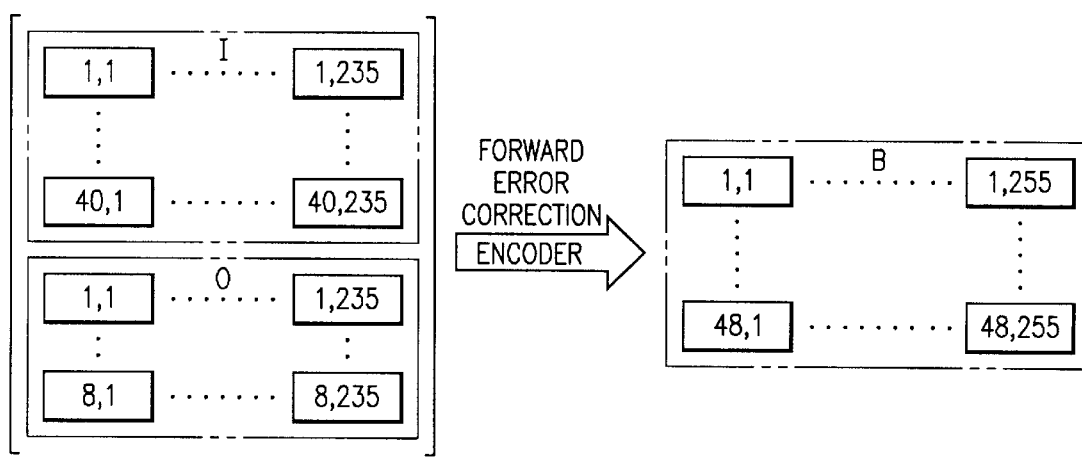
FIG. 10 is a diagram illustrating encoding forward error correction information into the data as packaged in FIG. 9.

Turning to FIG. 10, advantageously, user data being transmitted via satellite is encoded using forward error correction. The forward error correction of this exemplary embodiment is known in the art as the "block-interleaved Reed-Solomon system." This system allows for receiving stations to recover from bit-errors and burst errors that otherwise may render an information page to be discarded. The encoding of data is performed on a row-by-row basis so that, for each memory page of user data, 48×235 bytes, the resulting data is arranged in 48 rows and 255 columns as shown in FIG. 10. The resulting data is referred to as a "data block," designated by matrix B. The encoding of information is well known in the prior art, for example see "The Theory of Error Correcting Codes," by F. J. Macwilliams and thus, N. J. A. Sloane, and will not be discussed here. Those familiar with the art will recognize that the resulting matrix satisfies that, for a symbol size of one byte (or 8 bits), the number of symbols in the field is 255 ($2^8-1=255$) and that a loss of up to 10 symbols (½ the redundancy, wherein 255–235=20) can be corrected when error positions are unknown and up to 20 symbols can be corrected when the knowledge of the exact positions of errored symbols is known.

Figure 11:
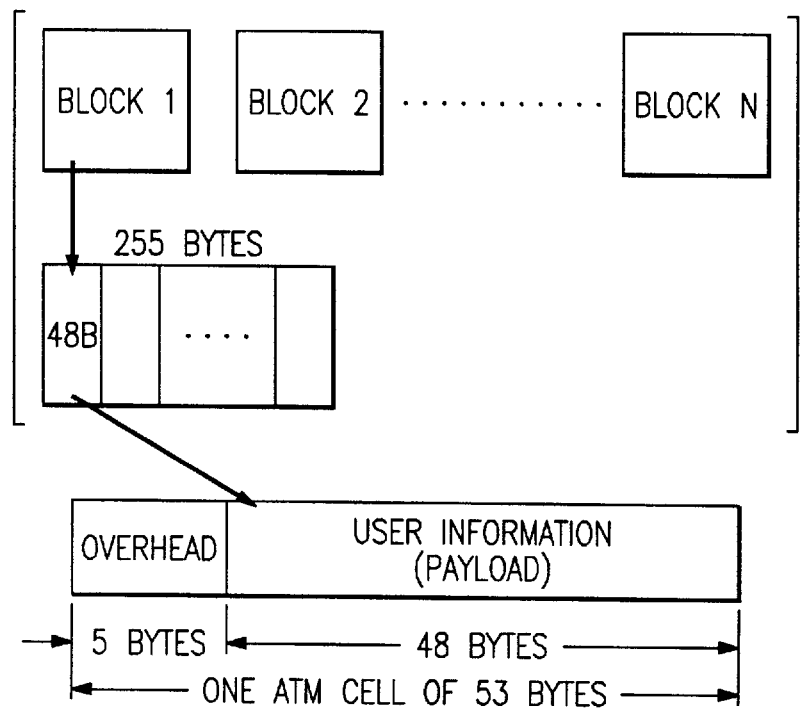
FIG. 11 illustrates transmission of the package blocks as shown in FIG. 10.

Turning now to FIG. 11, after encoding, SCANS 100 has the software arranged in blocks of 12,240 bytes, each in 48 rows and 255 columns as described above. The original user data is encoded to form blocks 1-N respectively. One column of each block (48 bytes) is then loaded into the payload of an ATM cell.

Figure 12:
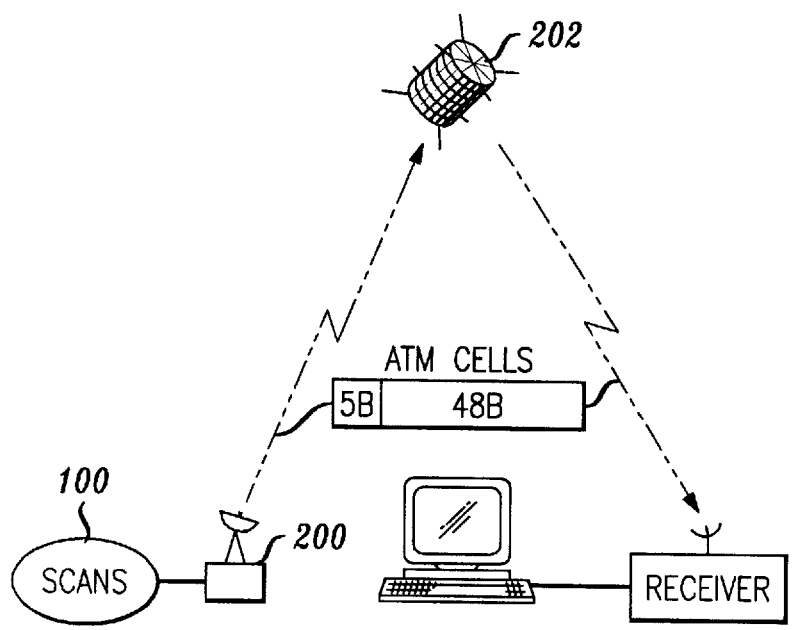
FIG. 12 illustrates individual cell transmissions according to the structure of FIG. 11.

Turning now to FIG. 12, in this exemplary embodiment, SCANS 100 is connected to a satellite uplink station 200. Satellite uplink stations such as 200, are well known in the art of, for example, audio, video, and data transmissions, and thus will not be described further. Satellite uplink transmitter transmits data to satellite 202. Satellite 202 may be in geosynchronous, low earth, or medium earth orbit depending on the nature of application and geographic area to be covered. Satellite 202 retransmits the data signal to multiple locations, in this example, to a plurality of switching offices, such as 102–118 (FIG. 7).

In this exemplary embodiment, SCANS 100 starts transmitting data from the beginning to the end, i.e., block-1 through block-N (FIG. 11). Within each block, SCANS transmits a single column of 48 rows as payloads of the ATM cells as shown in FIG. 11. In this arrangement, one block of information is transmitted as 255 ATM cells, whose beginning and end are identified by the information encoded in the Operations matrix (O) FIG. 10.

In this embodiment, SCANS 100 sends each block of data without waiting for any acknowledgements of receipt of previous blocks back from switching systems 102–118 (as in for example, User Datagram Protocol (UDP)). UDP is a well-known protocol used in computer and data communications, and, more particularly, in the Internet connected systems and, thus, will not be described further.

SCANS system 100 broadcasts the entire program (comprising blocks 1–N) via satellite uplink-downlink multiple times, with a waiting period between each broadcast. Currently, broadcast speeds of up to 30 and 40 Mbps (mega bits per second) are available. It is estimated that an entire switching system generic, originally 70 MB of executable code, can be transmitted in approximately 45 seconds (7447 blocks, each 12240 bytes transmitted at 30 Mbps). Therefore, even with a 5–10 minute wait period between broadcasts, it is possible to transmit and retransmit the entire switching system generic more than five times in one hour of satellite usage. It is thus obvious that the relative cost of usage is minimal compared to other alternatives used in the prior art.

Figure 13:
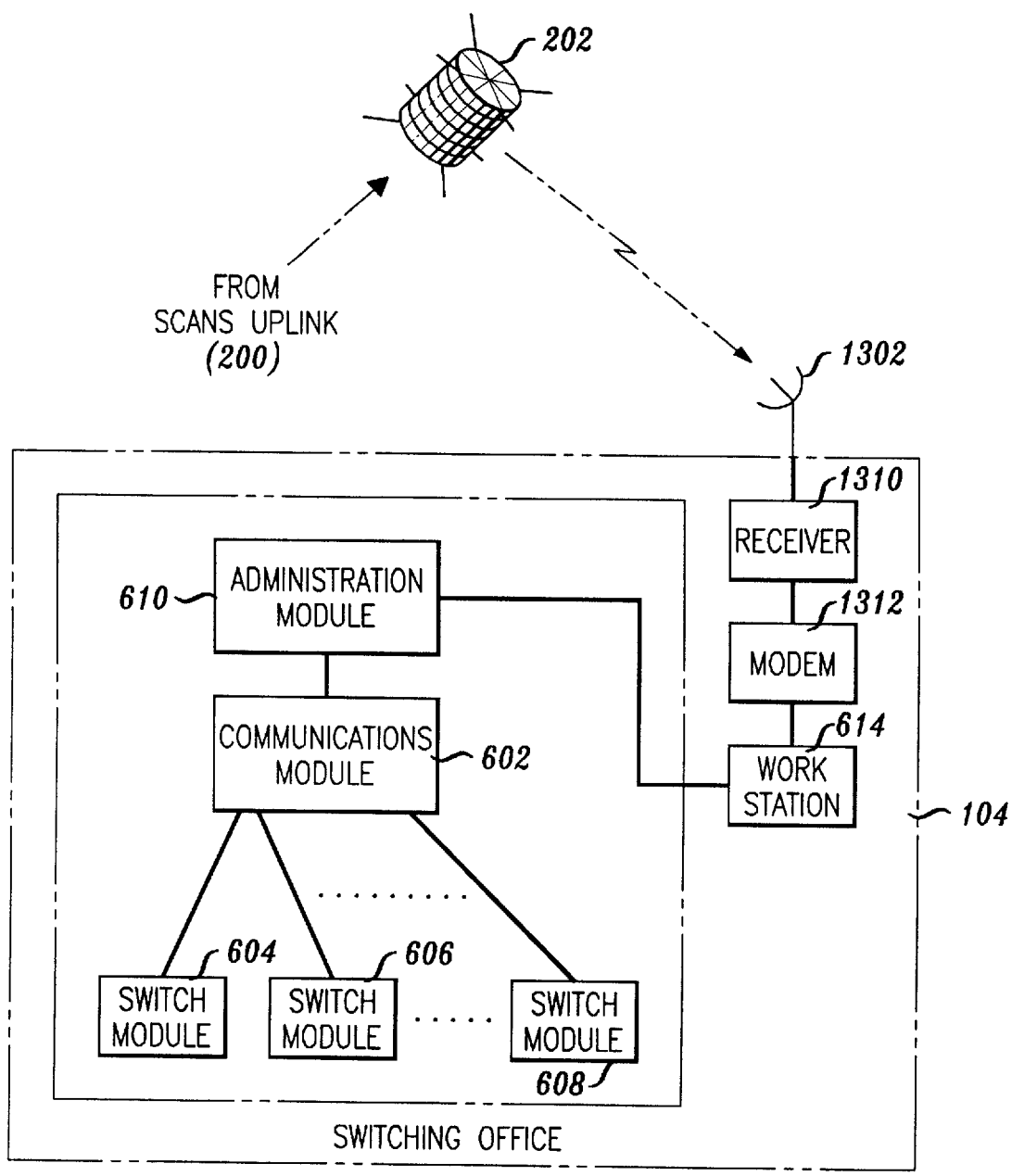
FIG. 13 shows the interaction between the satellite and the switching office for receiving data according to the exemplary embodiment of this invention.

Turning now to FIG. 13, a specific switching office is illustrated, operating to receive data from satellite 202. The program is transmitted from the SCANS 100 through satellite uplink 200, to switching office 104, which is fitted with an outside satellite antenna 1302. In an exemplary embodiment, this may be similar to, or the same as, the satellite receiver dishes commercially available for satellite television reception. Satellite receiver dish 1302 is connected to work station 614 by a receiver 1310 and modem 1312. Work station 614 includes an interface for receiving data from modem 612, and, as known in the art, performs any usual modem-performed translations. Furthermore, data may be encrypted and/or compressed in order to prevent others from intercepting the data transmission and to cut down on transmission time. Work station 614 also performs such decryption and decompression functions in order to process the received data and make available the original object code for the switching system 104. Further, work station 614 receives information from AM 610 regarding office configuration and compiles such data into a usable generic. Work station 614 then downloads the generic to AM 610, which in turn, propagates CM data to CM 602 and SM data through CM 602 to the SMs represented by 604–608. The physical link connecting CM 602 to SMs 604–608 supports 512 timeslots, and in one instance of the exemplary embodiment, two timeslots are used as control timeslots and the remainder are used for telephone calls.

Figure 14:
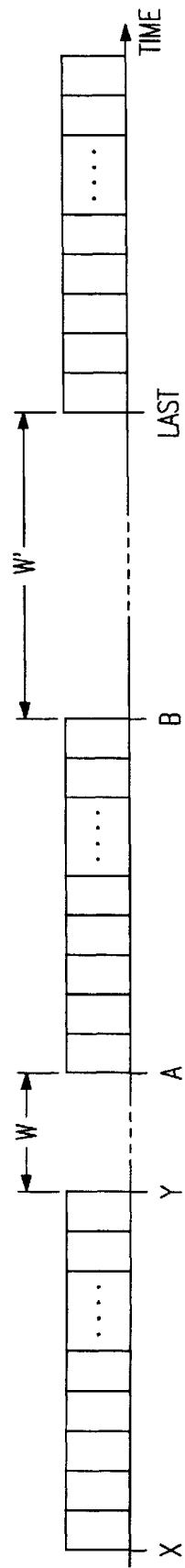
FIG. 14 illustrates the iterative nature of the transmission of data blocks according to the exemplary embodiment of this invention.

Turning now to FIG. 14, a time chart showing the transmissions of data blocks is shown. It is recognized that not every switching office will necessarily receive every ATM cell, data frame, or data block correctly. Furthermore, each switching office may have problems with reception of a different data block. However, since SCANS 100 broadcasts the data multiple times, each individual office has a high probability of receiving all of the data blocks on each subsequent iteration. In the example of FIG. 14, the first transmission of, for example, a generic object code, begins at time X and ends at time Y. There is a wait time of interval W during which each work station processes the data received and determines which data blocks were incorrectly received and could not be recovered through means of error correction. A second transmission then begins at time A and proceeds through to end at time B. The data transmitted in Transmission A-B is identical to the data transmitted in Transmission X-Y. This mechanism of data transmission and wait time of interval W continues through to the last transmission, which again broadcasts the exact same data as Transmission X-Y and Transmission A-B. The number of transmissions is a parameter which may be varied according to field of experience, environment and weather conditions, and the nature and criticality of an application.

Figure 15:
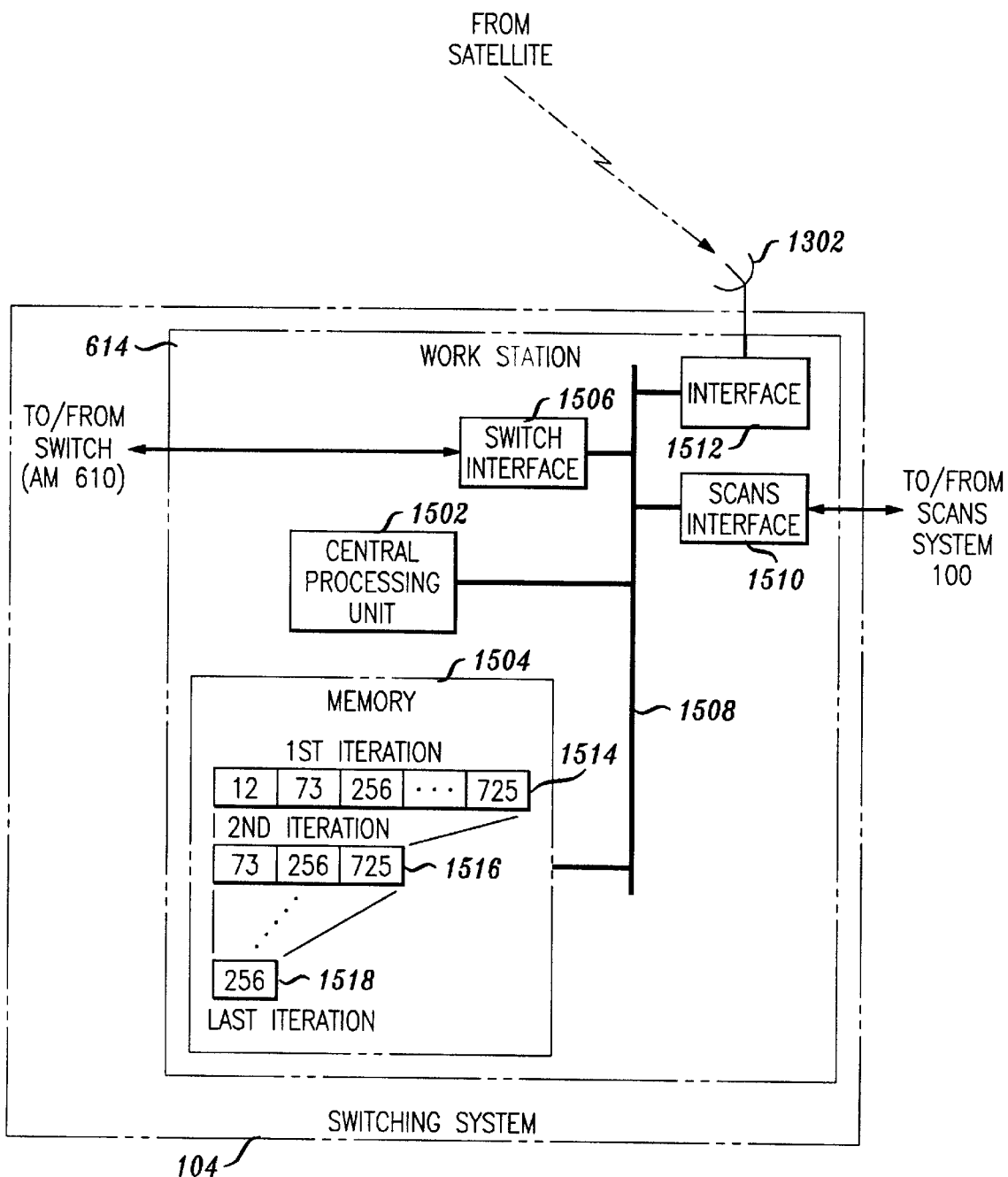
FIG. 15 illustrates those portions of a work station as illustrated in FIG. 13 which tracks the blocks that were not received properly.

Turning now to FIG. 15, the operation of work station 614 is illustrated in block diagram form. Work station 614 comprises, as is generally known in the art, a CPU 1502, memory 1504, an interface to the switch 1506 (specifically AM 610), and a bus 1508. Additionally, work station has a SCANS interface 1510, as known in the art. Finally, work station 614 also includes a satellite dish interface 1512. The satellite dish interface includes a receiver and a modem as used in data communications. In one implementation, interface 1512 may process all data transmissions received from the satellite interface and pass the received ATM cells to work station 614 for further processing. In this arrangement, satellite transmitter-receiver units can be supplied by a variety of service providers and maintain an open (non-proprietary) interface between the work station bus 1508 and interface 1512. Alternatively, the receiver and modem unit interface 1512 may be enhanced with software provided by the SCANS 100, i.e., combine the functions of satellite receiver 1512 and the SCANS interface 1510 into one integrated system which allows SCANS error detection, correction, and recovery procedures to work directly with the satellite receiver for efficient processing. It is known in the prior art that such integration of functions can be efficiently implemented in hardware but proprietary to the manufacturer whereas the software structure, described above, may be inefficient but have an open architecture.

In operation, data is received from the satellite dish 1302, and is sent to interface 1512. Interface 1512 processes the data received based on data link layer checks, such as frame check sequence and/or cyclical redundancy checks, to determine bit-errors during data transmission. Some errors may be recovered based on procedures built into the transmitter and the receiver. For example, when using ATM transport, the 5 bytes of ATM header information may correct 1 bit errors during data transmission. Advantageously, additional layers of Forward Error Correction are generally built into the commercially available transmitter-receiver systems. The receiver interface 1512 processes the received data as necessary and sends the data via bus 1508 to memory 1504, under control of CPU 1502. SCANS interface 1510 assimilates all of the received data in the block structure, block-1 through block-N, as arranged at the transmitting end.

Figure 16:
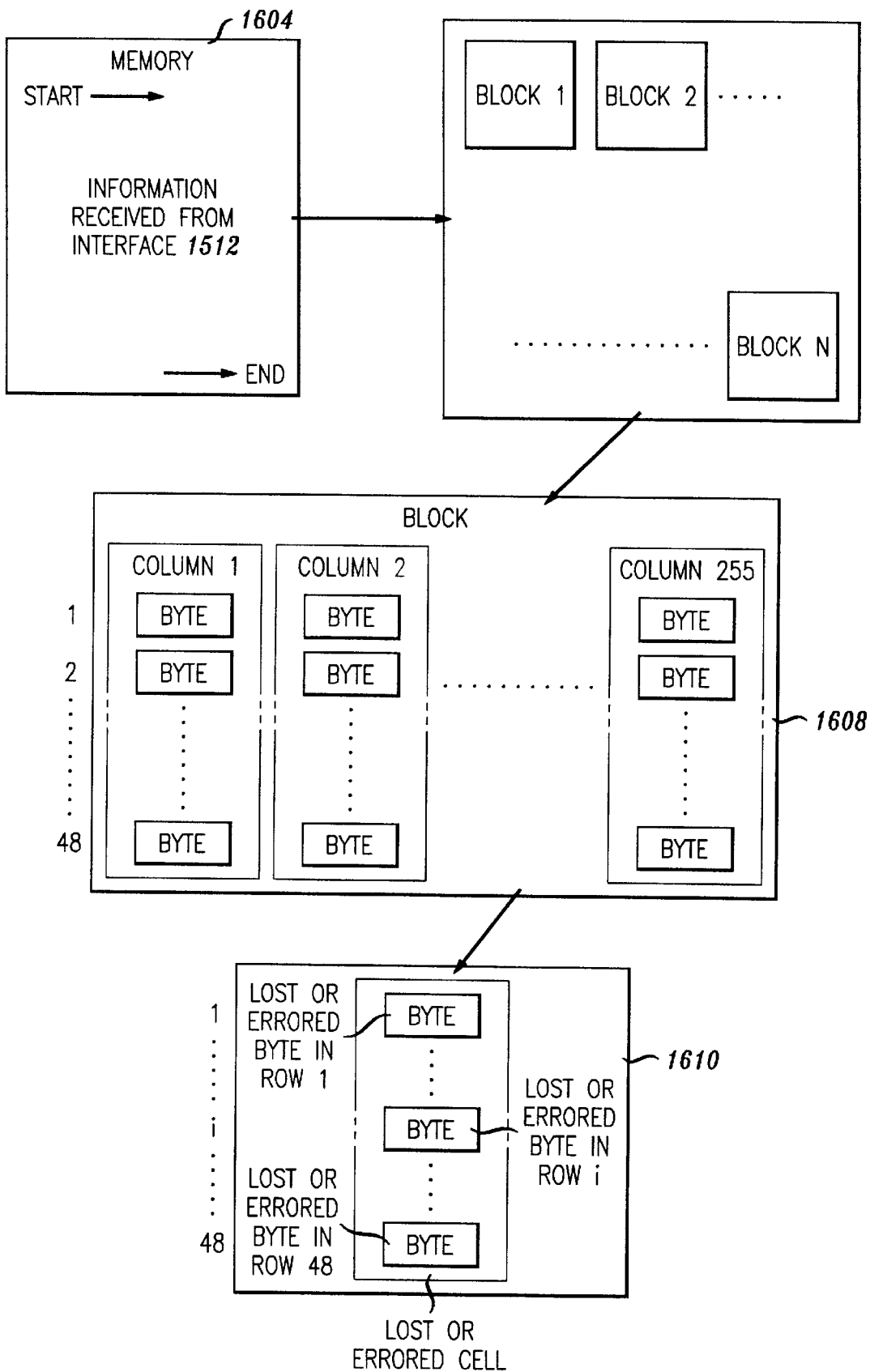
FIG. 16 illustrates the processing of work station of FIG. 15 illustrating how lost blocks are determined.

SCANS interface 1510, under the control of CPU 602, performs the error detection, correction, and recovery procedures to determine if any of the blocks are unusable due to bit-errors, corruption, or lost cells. This procedure is performed on each of the received blocks, (as illustrated in FIG. 16). Data link layer checks performed by the satellite receiver interface 1512 may report lost ATM cells. A lost ATM cell corresponds to a loss of one column in a block. In other words, in each row of the block, the satellite receiver interface marks the same cell as errored/lost or improperly received as illustrated in column 1610 (FIG. 16). If the number of registered errors in block 1608 exceed 20 (which is the redundancy built into the system by block-interleaved Reed-Solomon encoding from FIG. 10), no further attempt is made to recover the block and the block is marked for recovery through future retransmissions from the SCANS 100. If the number of errors are less than 20, the error locations are known from the satellite interface 1512, and may also be obtained from the Operational matrix (O). Thus, decoding procedures of forward error correction are applied to recover the block. The decoding procedures are well known in the prior art and will not be described further.

CPU 1502 stores, a list of blocks that could not be recovered in a location of the memory 1504. For example, at the end of first iteration (i.e., after completion of the first SCANS transmission and before the commencement of second SCANS transmission), CPU 1502 stored in memory 1504 the list as illustrated in 1514 containing block numbers 12, 73, 256, etc. up through 725. In the second iteration, during error detection, correction, and recovery processing by SCANS interface 1510 after the second transmission of SCANS 100 ends at time B as shown in FIG. 14, the list is updated to show blocks still to be recovered as the list 1516, i.e., numbers 73, 256, and 725.

Figure 1:
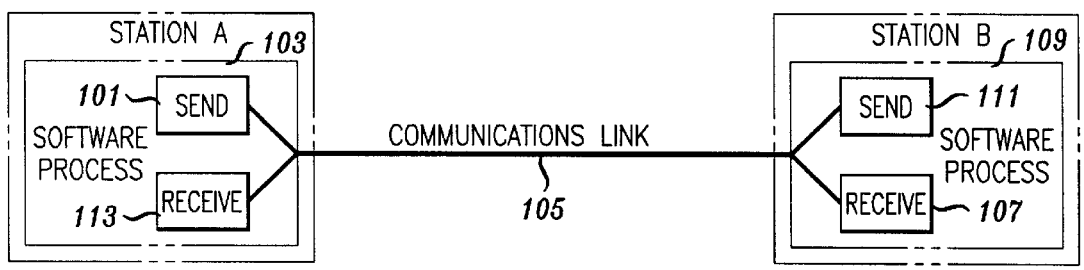
FIG. 1 is a block diagram of a prior art point-to-point communication link.
Figure 2:
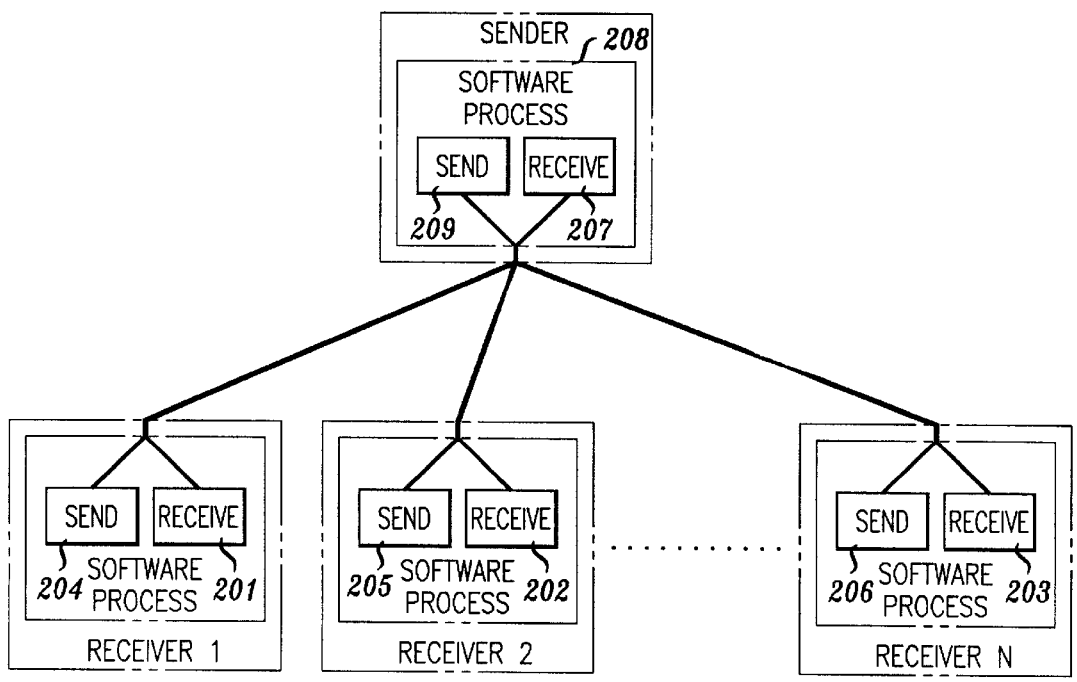
FIG. 2 is a block diagram of a prior art point-to-multipoint configuration of data transmission.
Figure 3:
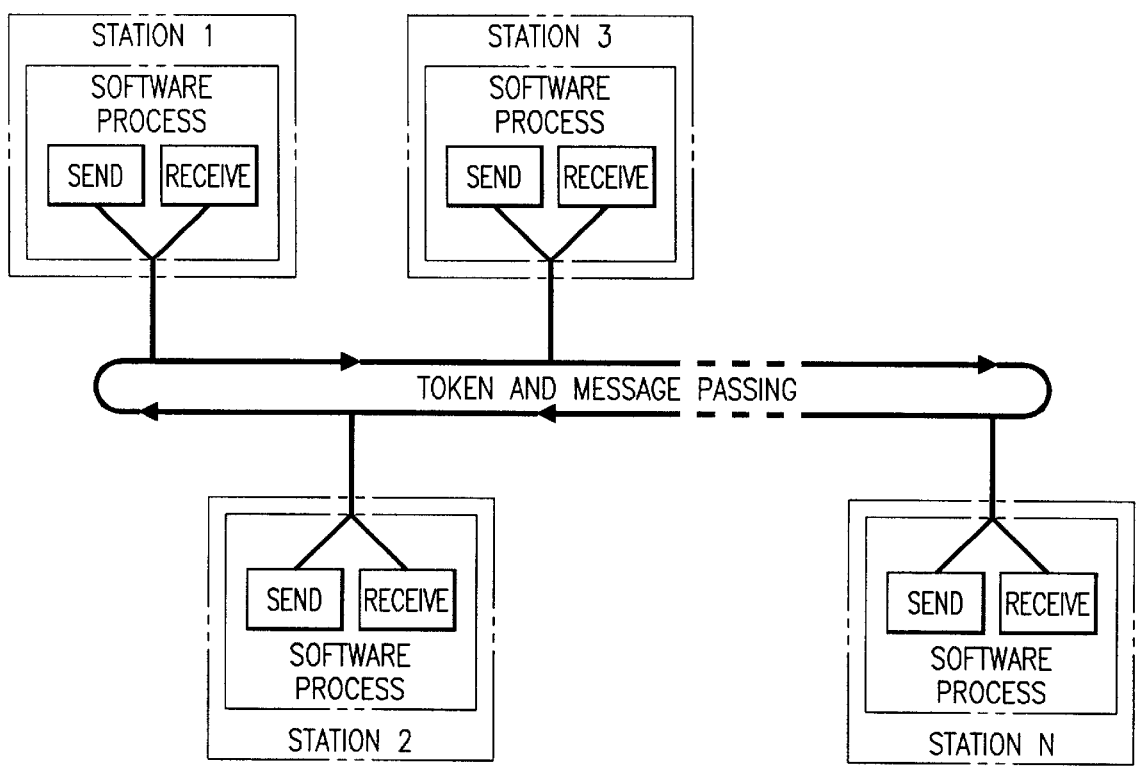
FIG. 3 is a block diagram of a prior art multipoint-to-multipoint data distribution system.
Figure 4:
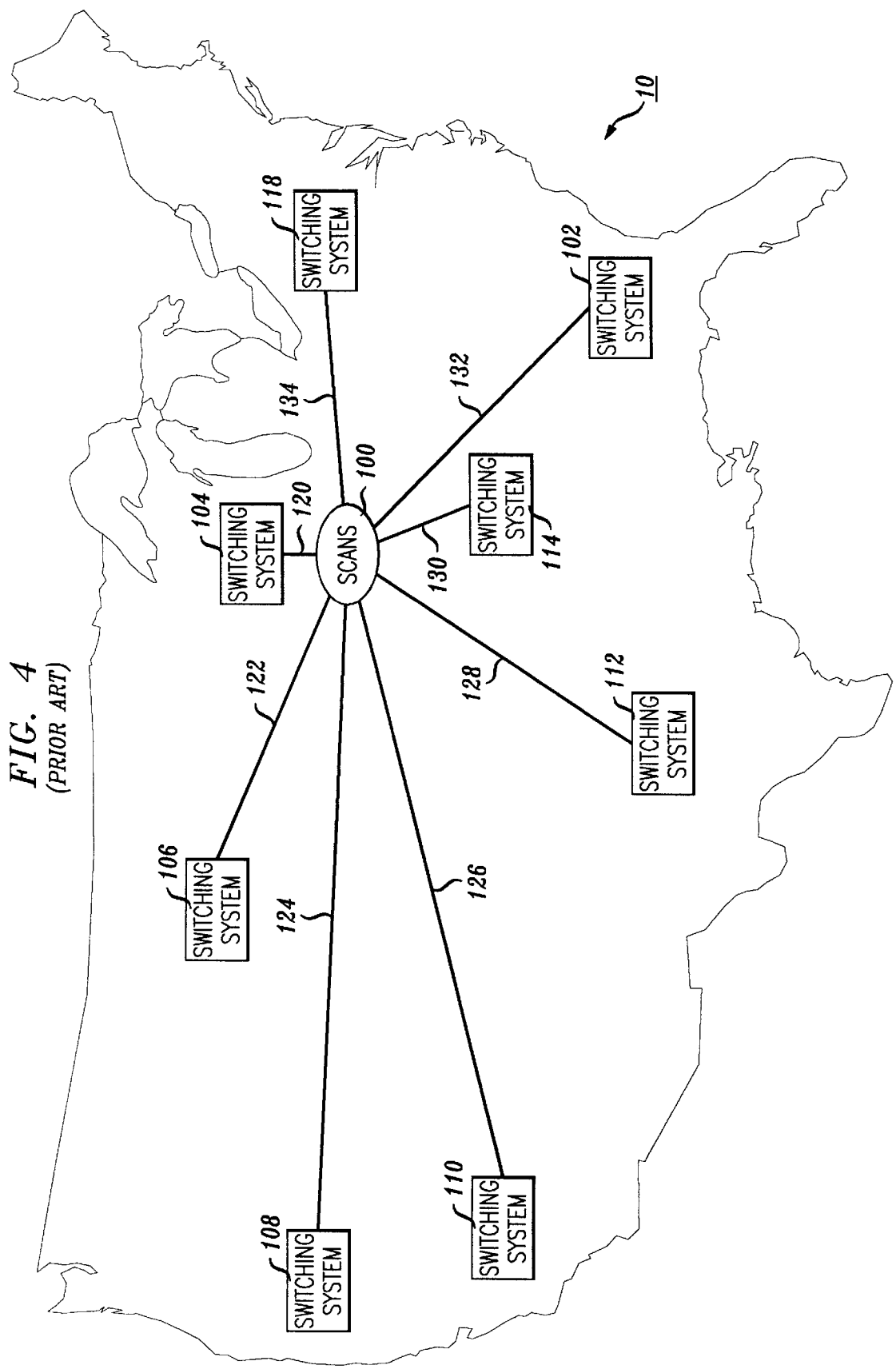
FIG. 4 is a prior art block diagram of the current approaches to software update system as used in telecommunication systems.
Figure 5:
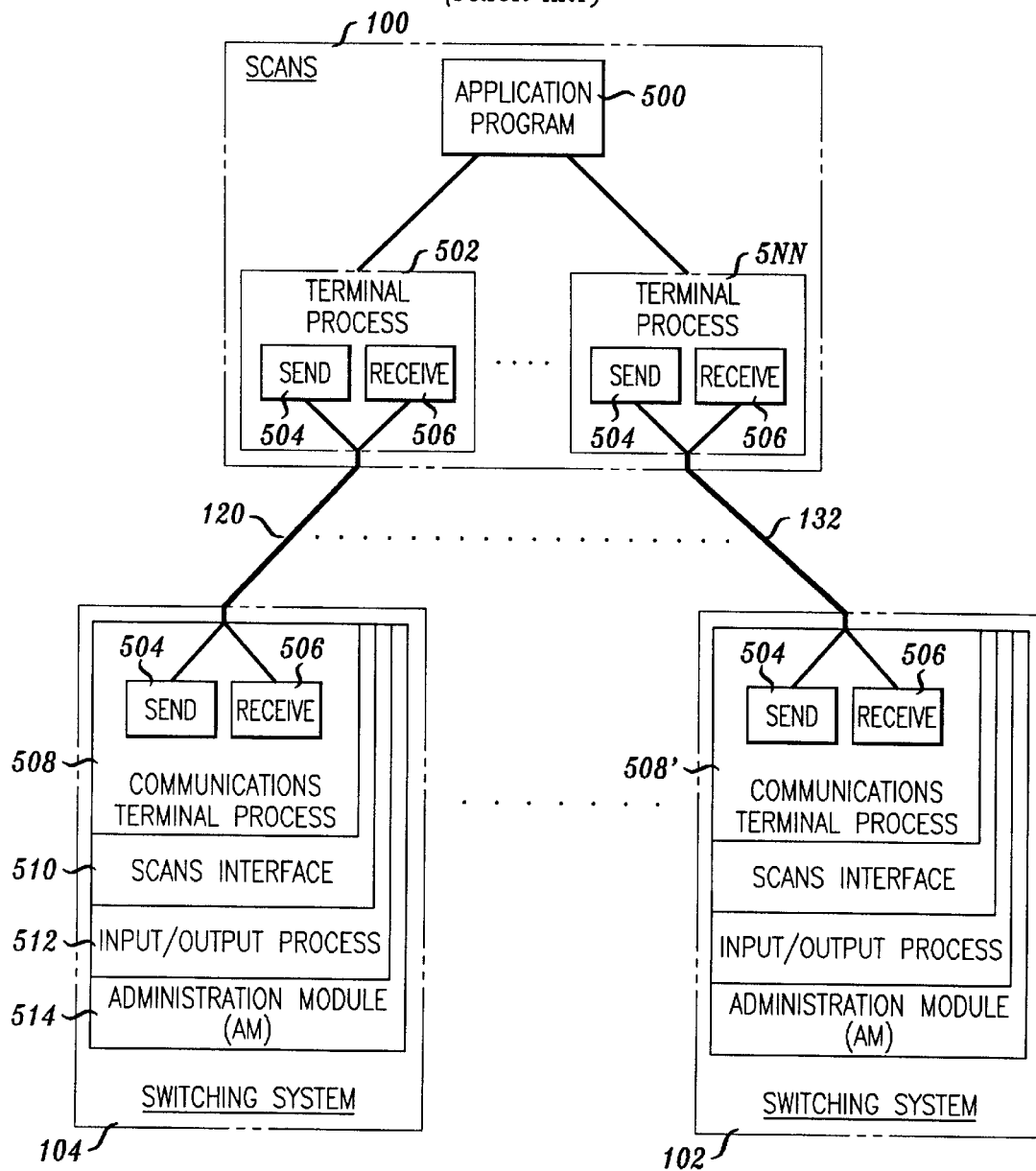
FIG. 5 is an example of a block diagram of a prior art system of FIG. 4 showing the numerous processes required in order to distribute software through the system of FIG. 4.
Figure 6:
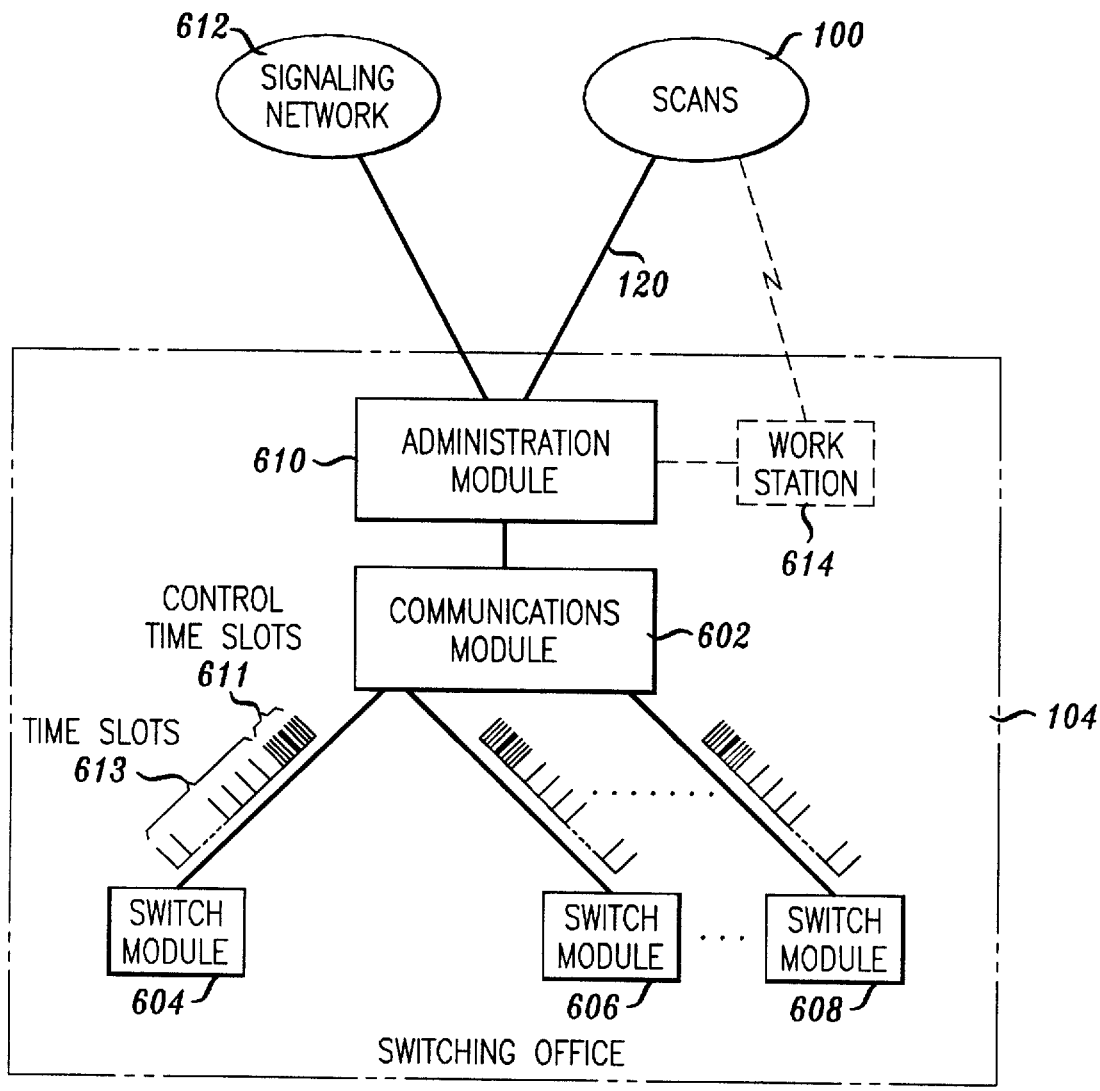
FIG. 6 is a block diagram of a prior art switching office illustrating how software received from the system as shown in FIGS. 4 and 5 is distributed through the switching office.

After the last iteration, the list of blocks to be recovered should be an empty list. An example of non-empty list is presented into FIG. 15 demonstrate the completeness of the design of this exemplary embodiment. After all iterations, CPU 1502 indicates a non-empty list 1518, illustrates that block 256 is still on the list and is yet to be recovered. At this point, CPU 1502 then causes a connection to be made through SCANS interface 1510 to SCANS 100 (FIG. 4). CPU 1502 requests that SCANS system send block 256 in the manner of the prior art. However, since only one block is being requested, a point-to-point connection is arranged for a very short duration of time for such data transmission. CPU 1502 then processes the data as known in the art. Alternately, some receiving stations at regional maintenance centers may be equipped to support point-to-point communication links for delivering small quantities of information, such as block 256 in this example.

Figure 17:
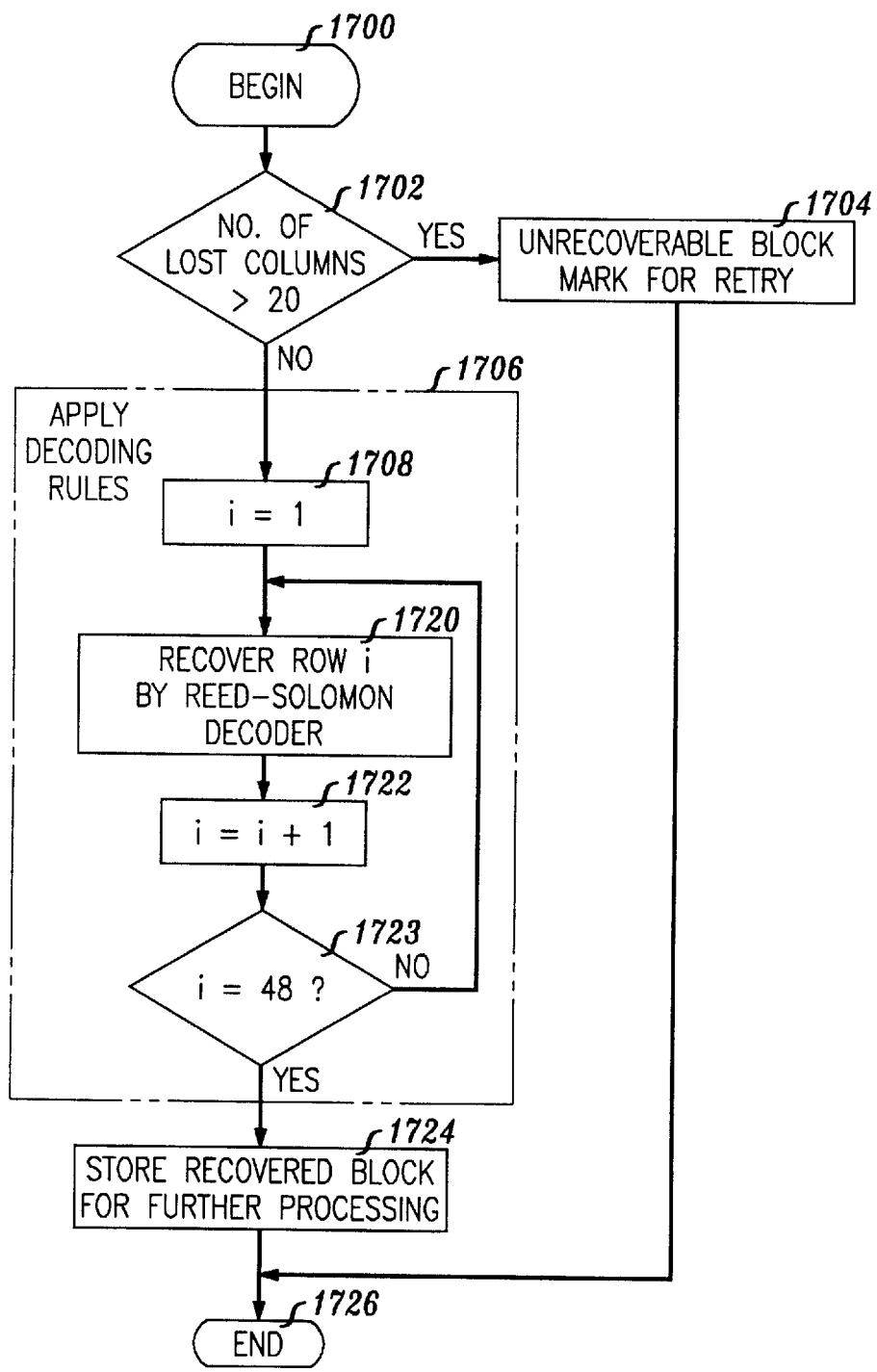
FIG. 17 is a flow chart illustrating the processing according to FIG. 16.

Turning now to FIG. 17, a flow chart illustrating processing for determining whether a block can be recovered is shown. Processing begins in circle 1700 and proceeds to decision diamond 1702 where it is determined if the number of lost columns is greater than 20. If it is, then processing proceeds to block 1704 where the block is deemed to be unrecoverable and is marked for retry at the next transmission. If, in decision diamond 1702 the number of lost columns is not greater than 20, then processing proceeds to the box marked 1706, where the decoding rules are applied to each row in turn. Generally, this comprises, starting with block 1708, I is set to one for the first row. Processing next proceeds to action box 1720, where row I is recovered by the Reed Solomon decoder as known in the art. Processing next proceeds to box 1722, where I is incremented so that the next row is examined. The activity of decoder box 1720 is applied iteratively under control of decision diamond 1723 until all rows are recovered. Processing then proceeds to box 1724 where the recovered block is stored for further processing according to this invention. Processing of the block ends in box 1726.

Figure 18:
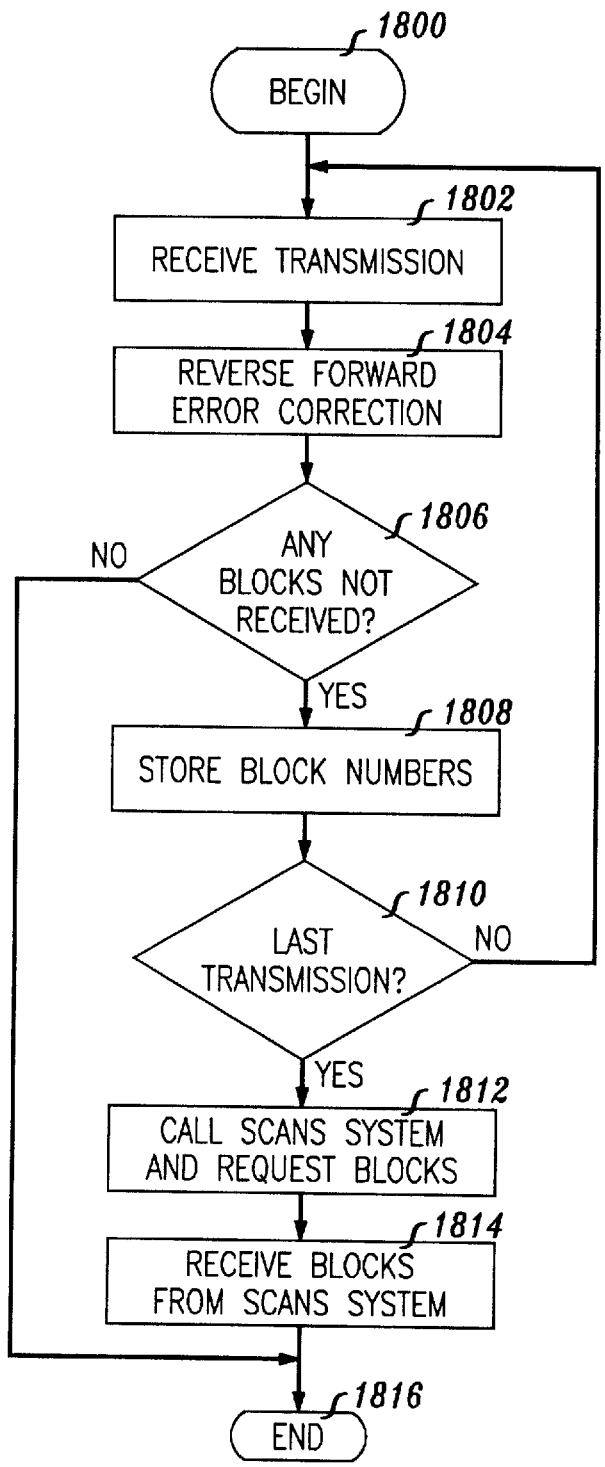
FIG. 18 is a flow chart illustrating the general operation of the work station according to FIG. 15.

Turning now to FIG. 18, a flow chart of operation of work station 614 during receipt of data is described. Processing starts in circle 1800 and moves to action block 1802 where the transmission is received. The transmission is received through the antenna interface and stored in memory, as described above. Processing then proceeds to action box 1804, where forward error correction is reversed (i.e., decoding techniques are applied) so that a determination can be made as to which blocks are properly received and which blocks are not received, as according to the previous flow chart (FIG. 17).

Processing continues to decision diamond 1806, where a determination is made if any blocks were not received; if so, then in action box 1808, the block number or numbers are stored in memory. Processing continues to decision diamond 1810 where a determination is made whether the transmission received in action box 1802 was the last transmission. If not, then processing proceeds back to action box 1802 where the next transmission is received.

If, in decision diamond 1810, the transmission were the last transmission, then processing proceeds to action box 1812 where SCANS 100 is called and any block or blocks not received are requested. Processing proceeds to action box 1814 where such blocks are received from the SCANS or a regional maintenance center. Processing ends at circle 1816. At this point, work station 614 has all of the data it needs in order to update switching office 104.

Figure 19:
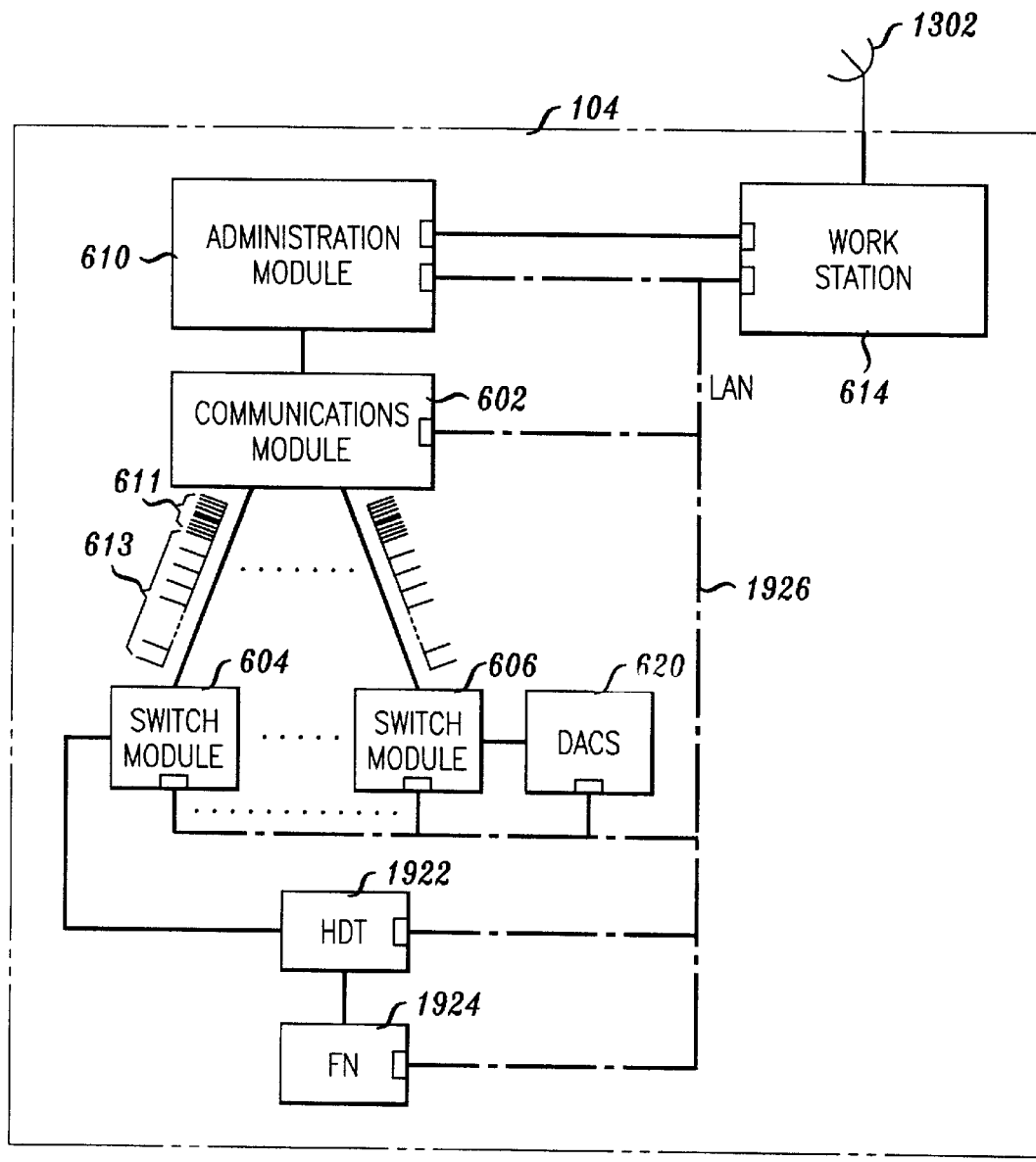
FIG. 19 illustrates a block diagram of a switching office wherein a local area network is used to distribute received software.

Turning now to FIG. 19, an exemplary embodiment of this invention is shown in block diagram. The object of this invention is to distribute data directly to the unit for which it is intended, rather than sending it to the administrative module 610, and distributing it from there, as in the prior art. Further, in the prior art, software distribution from one module to another is accomplished through control timeslots 611 operating at 64 kbps. For "software pump" applications in the prior art, two control timeslots are used to pump software image (object code) from CM 602 to other units such as SM 604. In the present invention, the delay due to low-speed pumps is overcome and an advancement is achieved to update software images in many units simultaneously.

In the present invention, each module may be updated simultaneously with other modules, may be updated serially, or in any other fashion required by the particular applications.

Figure 20:
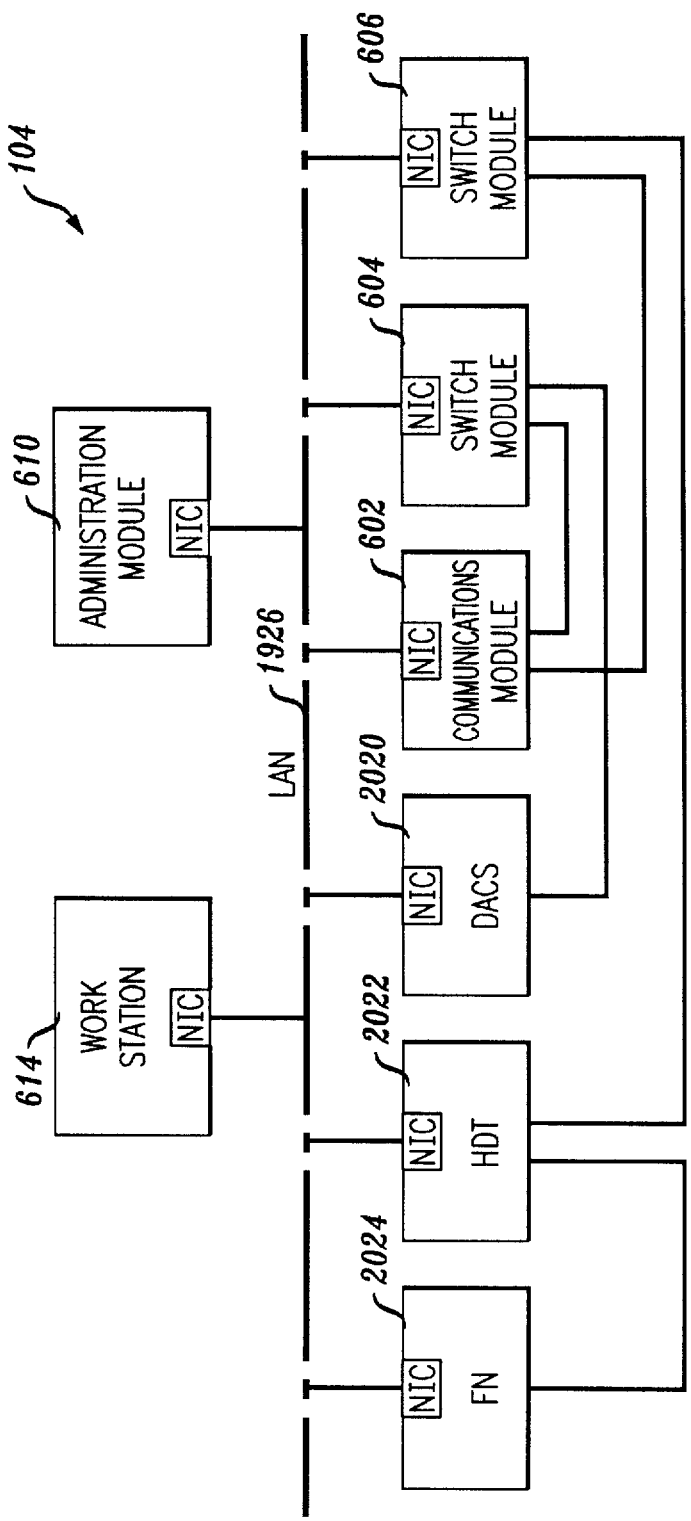
FIG. 20 illustrates a block diagram of a further embodiment of this invention.

FIG. 20 illustrates a typical 5ESS switching office 104 with several peripherals as known in the art. 5ESS switching office 104 comprises, as described above, a communication module 602, which acts as a hub between switch modules represented by modules 604 and 606, and administrative module 610. Switching office 104 also includes a Digital Access Cross-connect System (DACS) 2020 to connect DS1 and DS3 interfaces, as known in the prior art. Switching office 104 is also equipped with a Host Digital Terminal (HDT) 2022 for terminating digital lines from, for example, one or more subscriber loop carriers. Finally, 5ESS switch includes a fiber node (FN) 2024.

In this exemplary embodiment, all of the units are connected to work station 614 by way of a Local Area Network 1926. In one exemplary embodiment, LAN 1926 is an ETHERNET LAN operating at 10 Mbps. Alternatively, LAN 826 may be an ETHERNET LAN operating at 20 Mbps, 100 Mbps, or an ATM network as known in the prior art in data communications. Each peripheral has in it a network connection card (NCC) in order to interconnect the processor or processors and memory of the peripheral units to the LAN. In this way, work station 614 may distribute programs directly to their destination unit without passing through AM 610 and the required time to pump data from AM 610 through CM 602 to each of the peripheral units. Thus, this invention provides not only a faster update, but may also update individual units, further increasing the speed of updates up to and including a full generic update from hours to minutes or less.

It is to be understood that the above-described embodiments are merely illustrative principles of the invention, and that many variations may be devised by those skilled in the art without departing from the scope of this invention. It is, therefore, intended that such variations be included within the scope of the appended claims.

The invention claimed is:

1. A system for rapid processing code data update delivery code within a distributed processing system, said system comprising:

a work station for receiving said data updates;

a plurality of processing units interconnected by data buses, said data buses providing communication among said plurality of processing units said processing units operating using said program code, wherein said program code uses fixed data that is processing unit specific;

each of said plurality of processing units and said work station including a local area network (LAN) interface;

a LAN connected to each of said LAN interfaces;

said work station including means for determining which one of said plurality of processing units receives which portion of said data, and means for addressing said portion of said data and sending said data over said LAN so that the LAN interface for each processing unit receives only its own data; and wherein said data comprises an incremental change to executable program code rather that a complete change of the program code, so that said data updates are sent over said LAN to each LAN interface for each of said plurality of processing units faster than said processing units can communicate over said data buses.

2. A system for rapid processing code data update delivery within a distributed processing system, said system comprising:

a work station for receiving said data updates;

a plurality of processing units interconnected by data buses, said data buses providing communication among said plurality of processing units;

each of said plurality of processing units and said work station for receiving updates including a local area network (LAN) interface;

a LAN connected to each of said LAN interfaces, said work station including means for determining which one of said plurality of processing units receives which portion of said data, and means for addressing said portion of said data and sending said data over said LAN so that the LAN interface for each processing unit receives only its own data; and wherein said data comprises a generic update, which represents a new version of program code, so that said data updates are sent over said LAN to each LAN interface for each of said plurality of processing units faster than said processing units can communicate over said data buses.

3. A system in accordance with claim 1 or 2 wherein said work station includes means for querying each of said plurality of processors for said fixed data and means for integrating said received data updates and said fixed data into a load for each of said plurality of processors before delivering said data to each processor over said LAN.

4. A system for rapid and reliable broadcast to distribute electronic data, said system comprising:

an earth station having a source of said electronic data, an earth orbiting satellite and a plurality of earth stations for receiving said electronic data;

said earth orbiting satellite including means for receiving data from said source earth station and means for broadcasting said data back to said plurality of earth stations;

said source earth station including means for formatting said electronic data into data blocks and means for transmitting said data blocks to said satellite repetitively;

said plurality of earth receiving stations including means for receiving said broadcast data blocks and means for unformatting said data blocks, said means for unformatting said data blocks including means for detecting errors in said data blocks and said plurality of earth receiving stations having means for monitoring a next one of said repetitive broadcasts only for data blocks previously received which contain errors, so that no acknowledgment of data receipt is required from any of said plurality of earth receiving stations and thus as many receiving stations may receive said electronic data as can receive said broadcast from said satellite; and each receiving system comprising a distributed processing telephone switching system, said switching system having a plurality of components including at least an administrative module, a communications module, and a plurality of switching modules interconnected by data communications lines, means for receiving said data, said receiving means including means for formatting said data into a form usable by said telephone switching system, each of said plurality of components and said means for receiving data including a local area network (LAN) interface, and a LAN connected to each of said LAN interfaces, so that said receiving means sends said data over said LAN to each LAN interface for each of said plurality of components faster than communicating said data through said data buses.

5. A system in accordance with claim 4 wherein said system for receiving data comprises a work station.

6. A system in accordance with claim 5 wherein said electronic data comprises operational code for a telephone switching system, and said work station delivers said code to said telephone switching system, wherein said code is integrated with data from said telephone switching system so that said telephone switching system can operate using said new code.

* * * * *